Figure 1:
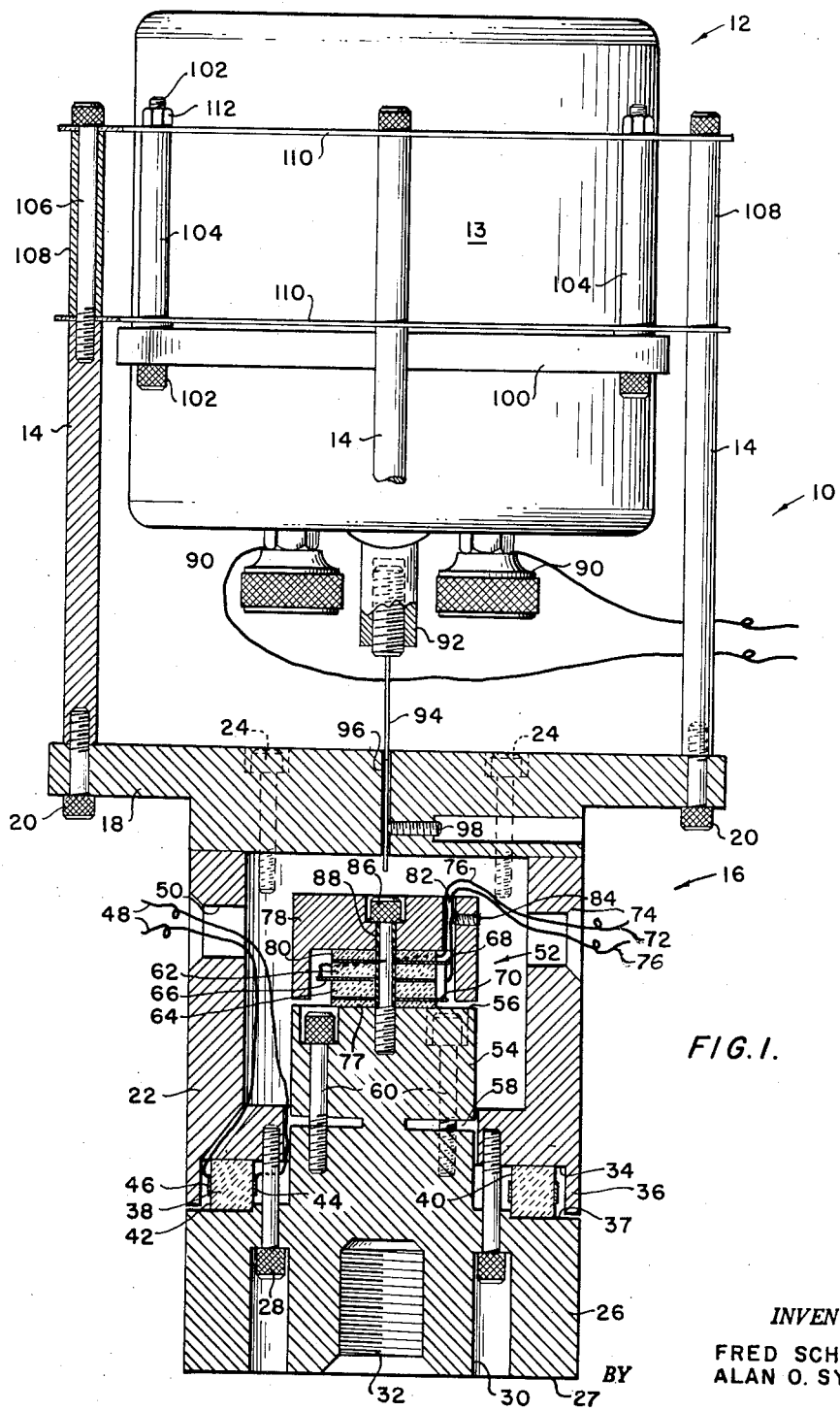

Jan. 1, 1963

F. SCHLOSS ETAL 3,070,996

MECHANICAL IMPEDANCE METER

Filed Oct. 13, 1959

2 Sheets-Sheet 1

INVENTORS
FRED SCHLOSS
ALAN O. SYKES

BY B. L. Zangwill

ATTORNEYS.

Jan. 1, 1963

F. SCHLOSS ETAL 3,070,996

MECHANICAL IMPEDANCE METER

Filed Oct. 13, 1959

2 Sheets-Sheet 2

INVENTORS
FRED SCHLOSS
ALAN O. SYKES

BY

ATTORNEYS

United States Patent Office 3,070,996
Patented Jan. 1, 1963

3,070,996
MECHANICAL IMPEDANCE METER
Fred Schloss, Bethesda, Md., and Alan O. Sykes, Vienna, Va., assignors to the United States of America as represented by the Secretary of the Navy
Filed Oct. 13, 1959, Ser. No. 846,214
10 Claims. (Cl. 73—67.1)
(Granted under Title 35, U.S. Code (1952), sec. 266)

The invention described herein may be manufactured and used by or for the Government of the United States of America for governmental purposes without the payment of any royalties thereon or therefor.

This invention relates to a meter adapted to measure the mechanical impedance of a mechanical element and more particularly to means for measuring such mechanical impedance at various different frequencies extending over a wide frequency range.

This application is a continuation-in-part of the applicants' copending application Serial No. 782,612 filed on December 23, 1958, entitled "Mechanical Impedance Meter."

Mechanical impedance is defined as the factor of proportionality between the vibratory force driving a mechanical element and the vibratory velocity this force produces, and may be expressed by the equation:

(1) $$Z = F \div V = F\omega \div A$$

where $Z$ = mechanical impedance, $F$ is the driving force, $V$ the velocity, $A$ the acceleration and $\omega = 2\pi f$, where $f$ is the frequency of the driving force. For a more complete discussion of the concept of mechanical impedance see U.S. Patent No. 1,880,425, October 4, 1932. The aforementioned patent gives a more complete description of a concept of mechanical impedance and the uses to which such information may be put.

The instant invention relates to a mechanism for applying a vibratory force to an object under test, means for determining the magnitude of the vibrating force, and means for determining the acceleration that this force produces in a mechanical element, in order that the above Equation 1 may be solved for mechanical impedance.

Most prior art devices for measuring mechanical impedance include a vibrating member adapted to be connected to the mechanical element under test for applying vibrations of varying frequency to said element, and further include a transducer means for measuring the force of the vibrations and the acceleration imparted thereby to the test element. The force and acceleration are measured in terms of voltages produced by electro-mechanical transducer devices of one sort or another. A major shortcoming of the prior art devices resides in the fact that the vibrating mass is usually quite large and bulky.

A further shortcoming of prior art devices is that connections between the vibrating mass and the structure under test were not made through the force gage alone. Such parallel connections, which have resonant frequencies falling within the range of test frequencies, give rise to spurious results being obtained from the transducers. Furthermore the aforementioned vibration generator frequently makes use of a D.C. power supply. Such a power supply usually has a hum level which at high mechanical impedances and harmonics of the line frequency is objectionable. An additional shortcoming frequently found in the accelerometer portion of the prior art devices is that the accelerometer tends to produce erroneous results by virtue of transverse strains produced in the transducer pick-up element at high impedance levels.

An object of this invention is to provide a mechanical impedance meter adapted to overcome the disadvantages found in the prior art devices.

Another object of this invention is to provide a mechanical impedance meter with a vibration generator, wherein the generator is free of direct connection to the structure being tested.

A further object of this invention is to provide an impedance meter having a force measuring means and an accelerometer arranged in a single housing.

Still another object of this invention is to provide a mechanical impedance meter having a force measuring means and an accelerometer, wherein said accelerometer is provided with an inertial mass that is free of connection with the impedance meter housing whereby the effects of resonant frequencies is minimized.

An added object of this invention is to provide a mechanical impedance meter having an accelerometer, wherein said accelerometer is rendered free of readings induced therein by forces other than movement of an inertial mass associated therewith.

Still an added object of this invention is to provide a mechanical impedance meter having a vibration generator connected with the meter by a needle-like member, with a generator casing supporting means that is adapted to isolate the generator casing from the impedance measuring elements whereby vibration of the generator is transmitted to the impedance measuring means by said needle-like member only.

A further object of this invention is to provide a mechanical impedance meter in which all electrical circuitry is balanced, that is, is free of any connection to ground.

Figure 2:
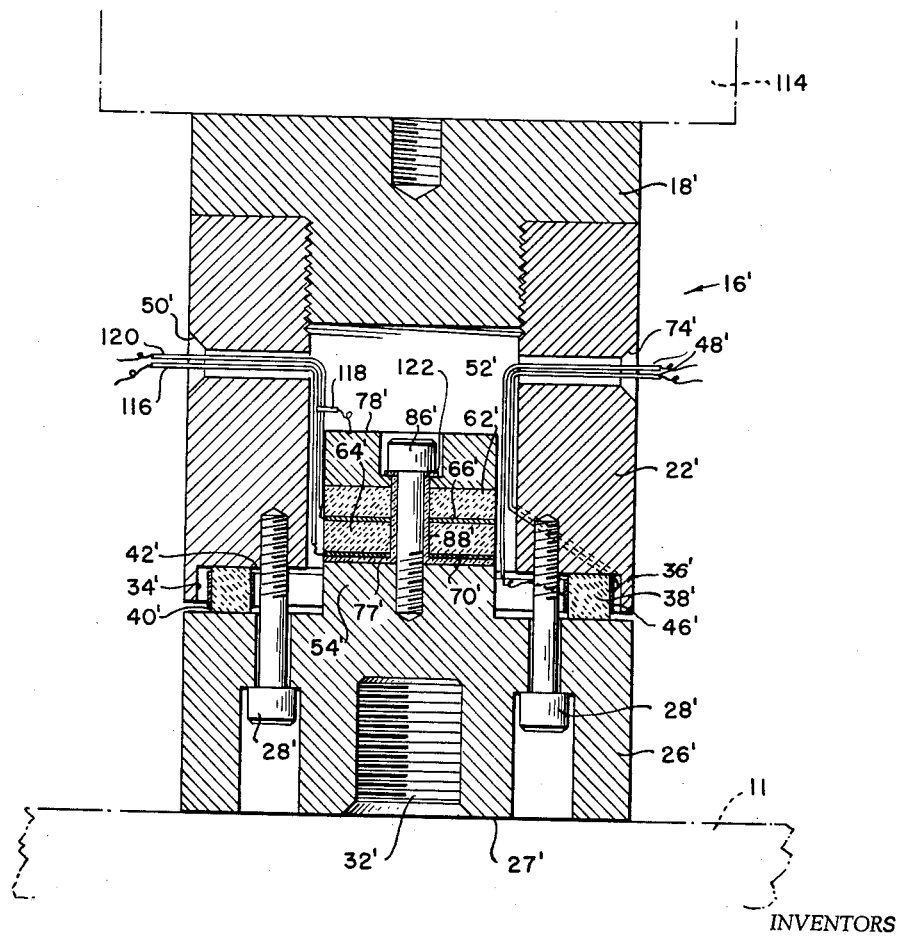

Other objects and many of the attendant advantages of this invention will be readily appreciated as the same becomes better understood by reference to the following detailed description when considered in connection with the accompanying drawings wherein:

FIG. 1 is an elevational view, partially in section, of a preferred embodiment of the instant invention; and FIG. 2 is an elevational view, in section, of a modified embodiment of the instant invention.

Referring now to the drawing wherein like or corresponding reference numerals designate like parts, there is shown in FIG. 1 a mechanical impedance measuring means 10, hereinafter designated simply as an impedance meter.

The impedance meter 10 is adapted to be attached to a member 11 undergoing test, and includes a vibration generator 12, having an outer casing 13 suspended from a plurality of symmetrically arranged post members 14. The vibration generator supporting means is hereinafter set forth in greater detail. The supporting posts 14 are bolted to an impedance head 16 being connected to an impedance head cover plate 18 by a plurality of bolts 20. The preferred embodiment of the impedance head 16 comprises a substantially cylindrical impedance head housing 22 to which the cover plate 18 is bolted by a plurality of symmetrically arranged bolts 24. The impedance head housing 22 has a cylindrical mounting adapter 26 connected to its lower end by a plurality of symmetrically arranged bolts 28 having the respective heads thereof mounted in a plurality of countersunk holes 30 provided in the free end of the mounting adapter 26. The mounting adapter 26 has a base portion having a flat lower surface 27. The adapter has a suitable means, as for example a countersunk and tapped hole 32, whereby the adapter can be rigidly connected to the mechanical structure 11 whose mechanical impedance is to be determined.

The housing 22 has a large central space that is open at the bottom of the housing. The lower edge of the impedance head housing 22, as viewed in the drawing, has a lower end surface including an annular recessed area 34 defined in part by an annular shoulder 36 that extends toward, but is spaced from, a juxtaposed portion of the mounting adapter 26. The mounting adapter 26 is in turn provided with annular upper end surface 37 facing the lower end surface of the housing and arranged in spaced, parallel and juxtaposed relation with the innermost wall of the recess 34.

The recess 34 is adapted to receive an annular, barium-titanate ceramic crystal 38 which is so dimensioned between its upper and lower faces so as to provide a space between the lowermost edge of the shoulder 36 and the adjacent face 37 of the mounting adapter 26. The crystal 38 is constructed in accordance with well known practice, and utilizes the well known piezo-electric characteristics of barium-titanate crystals, so that the inner and outer peripheral surfaces thereof 40 and 42 become oppositely charged when the crystal is compressed between the housing 22 and the mounting adapter 26. When compressed, a voltage appears across the inner and outer surfaces 40 and 42 of the crystal 38. In order that the aforementioned voltage may be measured, the inner and outer surfaces 40 and 42 have bonded thereto strips 44 and 46 of electrically conductive material, said strips having suitable electrically insulated electric wires 48 soldered or otherwise electrically connected thereto and extending through suitable passageways provided in the housing 22 and through an opening 50 to the exterior of the housing 22.

The aforementioned crystal 38 serves as a force measuring device in a manner hereinafter described.

The instant invention further includes an accelerometer structure 52. The accelerometer 52 is mounted on the innermost end of a pedestal member 54 integrally formed with and extending inwardly of the mounting adapter 26 and having an inner end face 56.

The pedestal 56 and the accelerometer carried thereby extend into the central space of the housing 22, spaced from its walls.

Inwardly of the inner end face 56 of the pedestal, said pedestal is provided with an annular groove 58 cut therein to a point spaced from the center of the pedestal whereby the pedestal is rendered discontinuous in structure between the lower mounting face of the mounting adapter and the innermost face 56 of the pedestal. As a result of the annular groove 58 the pedestal is, in a sense, formed in two parts and in order to stabilize the uppermost part of the pedestal, three screws 60 are mounted so as to extend from the face 56, through the pedestal and annular groove 58 and into the lowermost portion of the pedestal wherein said screws are threadedly mounted. Thus the uppermost portion of the pedestal above the peripheral groove 58 forms an adapter section that is relatively stable and substantially free of lateral movements relative to the base portion of the adapter comprising the lower portion of the pedestal below the groove 58 and the remainder or base portion of the mounting adapter 26.

The accelerometer supporting pedestal is constructed in what may be considered two parts, by virtue of the groove 58, so as to isolate the upper, accelerometer supporting portion or section of the pedestal from any lateral strains which may be induced in the mounting adapter 26 during operation of the device, so that the only motions imparted to the accelerometer will be those extending longitudinally of the impedance meter.

It is emphasized that the groove 58 is but one means for isolating the accelerometer 52 from the vibratory strains set up in the pedestal 54. More specifically, the general objective is to make the physical connection between the accelerometer-carrying section and the rest of the adapter 26 as small as possible, and any means that will accomplish this is generally satisfactory.

In addition to isolating the pedestal 54 from the adapter 26 in the manner set forth above, the instant invention includes certain other expedients designed to either eliminate or at least materially reduce lateral strains, due to bending in the adapter 26, which may in turn be transmitted to the accelerometer crystals hereinafter described to cause signal outputs in relation to such strains, and which outputs are not a true measure of acceleration. To accomplish this, the lower or bottom surface 27 of the adapter 26 is so designed that at least the periphery thereof conforms to the shape of the surface of the test member 11 to which the adapter is attached, so that the vibratory forces transmitted through the housing 22 the annular crystal 38 and thence through the adapter 26 to the surface of the member 11, travel in straight, unbroken lines through said housing, crystal and adapter via the peripheral portion of the surface 27, thereby placing the adapter in compression only. There are no bending strains created in the adapter 26 since that part of the surface 27, in contact with the structure 11 to be measured, is directly under the lower surface of the annular crystal 38 that is in surface contact with the upper, peripheral surface 37 of the adapter 26. If the peripheral portion of the bottom surface 27 of the base portion of the adapter 26 were spaced from the surface of the test member 11, the lines of forces traveling to it through the housing 22, the crystal 38 and adapter 26 would set up bending strains in the adapter 26, which would of course create spurious readings from the accelerometer.

The accelerometer 52 comprises two or more barium-titanate discs 62 and 64 each of which has a hole extending through the center thereof. The ceramic discs 62 and 64 are each constructed so that the opposing faces thereof will become oppositely charged when the disc is compressed. An electrically conductive plate 66, which may be annular in form, is interposed between the ceramic discs 62 and 64, and a pair of like electrically conductive plates 68 and 70 are affixed respectively to the upper surface of the upper ceramic disc 62 and the lower surface of the lower ceramic disc 64. The upper and lower electrically conductive plates 68 and 70 are connected in parallel with one another, and a single electrically insulated lead 72 extends from this parallel connection to the exterior of the impedance head housing 22 through a hole 74 in said housing. A second electrically insulated lead 76 is connected to the middle electrically conductive plate 66 and extends to the exterior of the housing through the hole 74. The lowermost conductive plate 70 is separated from the upper surface of the pedestal 54 by means of an electrically insulative disc 77 while the uppermost conductive plate 68 is separated from an inertial mass 78 by an electrically insulative disc 80. The inertial mass 78 is substantially cup shape in form, being mounted with the cup portion facing in a downward direction so as to lower the center of gravity of the mass. The mass 78 is preferably made of a material of high specific gravity, as for example the tungsten alloy sold under the trade name, Hevimet. The mass 78 is provided with a suitable passageway 82 extending therethrough, whereby the electrical wires 72 and 76 are adapted to pass into the impedance head housing 22 and out of the hole 74 formed in said housing. The mass 78 is provided with a set screw 84 adapted to clamp the electrical leads 72 and 76 relative to the mass 78. The entire accelerometer assembly is bolted to the uppermost face of the pedestal 54 by means of a screw 86 extending through holes formed respectively in the center of the accelerometer mass 78, the insulating discs 77 and 80, the electrically conductive plates 66, 68 and 70, and the barium-titanate crystals 62 and 64; the threaded end of said screw 86 being mounted in a suitably threaded hole formed in the uppermost end of the pedestal 54. It is pointed out that the outer surface of the unthreaded portion of the connecting bolt is covered with an insulating material 88 such as friction tape, plastic or the like, so as to insulate the various elements from the mass 78 and the pedestal 54. It is pointed out that the lowermost peripheral edge of the cup shaped mass 78 is spaced from the uppermost face of the pedestal 54.

It is emphasized that the force crystal 38, the acceleration crystals 62 and 64, and the electrical leads attached to said crystals are all insulated from the body of the impedance meter, and are therefore not grounded, thereby providing a balanced force and acceleration output for use with conventional differential amplifiers to eliminate ground loop problems and reduce power frequency pickup, all of which make possible the measurement of acceleration levels as low as 0.00005 g without filtering.

It is to be noted that the upper section of the pedestal 54 and the components carried thereby comprising the crystal means 62 and 64 and the mass 78 lie in the central space of the housing 22 but are completely clear of the housing, and that there is no direct mechanical connection in the space that extends between the housing, on the one hand, and this upper section and the parts carried thereby, on the other hand.

Referring once again to the vibration generator 12, it is pointed out that said vibration generator consists essentially of a permanent magnet mounted within the housing 13, and a movable coil mounted within the field of said magnet. Current is conducted to the coil through a pair of terminals 90.

The moving coil of the vibration generator 12 has a rigid post 92 connected thereto, which post in turn has a rigid or needle-like wire-like member 94 connected thereto in fixed relation therewith so that vibration of the coil in turn causes vibration of said wire member 94. It is pointed out that the vibration generator in essence consists of a structure very much like that found in a conventional loud speaker of the permanent magnet, moving coil type, except that in the instant case the moving coil is attached to a vibrating wire member 94 instead of a speaker cone. The lowermost end of the wire 94 extends into a suitably sized hole 96 formed in the impedance head cover plate 18, and is clamped relative to said cover plate by means of a set screw 98 extending at right angles to the hole 96, whereby said vibrating wire is fixed relative to said cover plate 18.

It is pointed out that the permanent magnet within the vibration generator housing is fixedly attached to the casing 13, and that inasmuch as the wire 94 is fixedly connected to the cover plate 18, said casing 13 acts as the vibrating mass of a reaction-type vibration generator; in accordance with the preferred embodiment of the instant invention said mass 13 has a natural frequency of approximately 30 c.p.s. when resonating with a pair of annular supporting springs 110 carried by the posts 14.

The vibration generator casing 13 obtains lateral and static support when it is in a stationary condition by virtue of its connection to the four supporting posts 14 referred to above. The generator casing 13 is provided with a laterally extending, fixed flange 100 that substantially encircles the casing. The flange 100 is provided with a plurality of elongated bolts 102, each of which extends through said flange and a tubular sleeve 104; the bolts 102 and sleeves 104 are preferably interspaced between the supporting posts 14. Each of the supporting posts 14 is connected at its lower end to the impedance head cover plate 18 by the bolt 20, and has an elongated bolt 106 connected to its upper end and extending through a tubular spacer sleeve 108.

The bolts 102 connected to the flange on the vibration generator casing 13 are connected to the supporting posts 14 by a pair of spaced parallel, flat annular or ring members 110 made of flexible material which when vibrated has the characteristic of being relatively free of sharp resonance peaks; Micarta is an example of such a material. Each of the annular members 110 is provided with a plurality of spaced holes through which the bolts 102 on the generator casing 13, and the bolts 106 on the posts 14 respectively extend. The annular members 110 are respectively clamped to the posts 14 between the lower end of each sleeve 108 and the upper end of the post 14, and between the upper end of the sleeve 108 and the lower face of the head of the bolt 106, as can be seen at the left hand side of the drawing. The annular members 110 are respectively clamped to the flange by the lower end of each sleeve 104 and the flange 100, and between the upper end of the sleeve 104 and a nut 112 screwed onto the upper end of each bolt 102.

The Micarta rings 110 act primarily to isolate the vibration generator 12 from the impedance head 16 and give it lateral support while it is vibrating, and also to give it static support when it is in the quiescent state. The particular means shown for mounting the generator relative to the impedance head, namely the aforementioned Micarta rings, has been found particularly valuable inasmuch as said rings act to substantially isolate the vibration generator from the impedance head except through the connection of the wire 94 with the impedance head cover plate 18. Thus, in effect, the vibration generator can be said to be dynamically supported, in a vertical direction, from the wire 94 alone at frequencies well above the natural frequency of the mass 13 on the springs 110. The force produced by the vibrating mass of the generator is transmitted through the needle or wire member 94 to the impedance head housing, and in turn to the mounting adapter.

It is pointed out that FIG. 1 is drawn substantially to scale, and that for a typical embodiment of the structure shown in FIG. 1, the housing 22 has an outside diameter of 1⅞ inches and an overall length of 1¹¹⁄₁₆ inches, while the pedestal 54 is ⅞ inch in diameter and the combined pedestal 54 and adapter 26 have a total length of 1⁹⁄₁₆ inches. It is also pointed out that the impedance meter shown in FIG. 1 has a frequency range of approximately 10–5000 cycles per second. It is emphasized that the foregoing dimensions are given as examples only and are not intended to be limiting in any sense.

Attention is now directed to FIG. 2 wherein is shown a modified impedance head 16' attached to the test member 11. The meter head 16' includes a tubular housing member 22' whose upper end is provided with a threadedly engaged cap 18'. A vibration generator 114 of any desired type, such as for example the generator 13 shown in FIG. 1, is attached to the cap 18' so that vibrations may be applied to the meter head 16'.

The housing 22' has a cylindrical mounting adapter 26', having a lower face 27', that is removably connected to its lower end by a plurality of screws 28' located in respective holes 30' in said adapter. The adapter 26' is in turn provided with a threaded hole 32' extending inwardly from the lower face 27', said hole 32' being adapted to receive a bolt or the like attached to the member 11 so that the meter may be firmly clamped to said member.

The lower edge of the impedance head housing 22' is provided with an annular recessed area 34' defined in part by an annular shoulder 36' that extends toward, but is spaced from a juxtaposed portion of the mounting adapter 26'.

The recess 34' is adapted to receive an annular, piezoelectric barium-titanate ceramic crystal 38' substantially like the crystal 38 described above, that is so dimensioned between its upper and lower faces as to provide a space between the lowermost edge of the shoulder 36' and the adjacent juxtaposed portion of the mounting adapter 26'. The crystal 38' has inner and outer peripheral surfaces 40' and 42' which have bonded thereto strips 44' and 46' of electrically conductive material that become oppositely charged when the crystal is compressed between the housing 22' and the mounting adapter 26'. When compressed, a difference in voltage of course appears across the inner and outer surfaces 40' and 42' of the crystal 38'. The aforementioned voltage is measured through a pair of insulation covered electric wires 48' soldered or otherwise electrically connected to the strips 44' and 46' and that extend through suitable passageways provided in the housing 22' including an opening 50', to the exterior of the housing 22' to an instrument or a meter (not shown).

The crystal 38', like the crystal 38 described above, serves as a force measuring device in the same manner as hereinafter described in connection with the crystal 38.

The embodiment of the invention shown in FIG. 2 further includes an accelerometer structure 52'. The accelerometer 52' is mounted on the innermost end of a pedestal 54' integrally formed with and extending inwardly of the mounting adapter 26'.

The accelerometer 52' comprises a pair of piezo-electric, barium-titanate discs 62' and 64', each of which has a hole extending through the center thereof. The ceramic discs 62' and 64' are each constructed so that the opposite faces thereof will become oppositely charged when the disc is compressed. An electrically conductive plate 66' which, like the plate 66, may be annular in form, is interposed between the discs 62' and 64', and a like electrically conductive plate 70' is affixed to the lower surface of the lower disc 64'. The lowermost conductive plate 70' is separated from the upper surface of the pedestal 54' by means of an electrically insulative disc 77'. An inertial mass 78' rests on the upper surface of the upper disc 62' in direct electrical contact therewith and is provided with a hole extending through the center thereof in alignment with the holes provided in the discs 62' and 64'. The lowermost electrically conductive plate 70' has an insulated electrical lead 116 connected thereto and also connected by a wire 118 to the inertial mass 78', thereby placing the upper surface of the uppermost crystal 62' and the lowermost surface of the lower crystal 64' in parallel connection with one another. Another insulated electrical lead 120 is connected to the intermediate plate 66' and the leads 116 and 120 extend outwardly of the housing 22' through a hole 50' provided in said housing. The inertial mass 78' is preferably made of a material of high specific gravity, as for example the tungsten alloy sold under the trade name, Hevimet, set forth above.

The entire accelerometer assembly 52' is bolted to the uppermost face of the pedestal 54' by means of a screw 86' extending through the holes formed respectively in the center of the accelerometer mass 78', the insulating disc 77', the electrically conductive plates 66' and 70', and the barium-titanate crystals 62' and 64'. The threaded end of the screw 86' is mounted in a suitably threaded hole in the uppermost end of the pedestal 54'. It is pointed out that the outer surface of the unthreaded portion of the screw 86' is covered with an electrically insulative sleeve 88' made of friction tape, plastic or the like, and the undermost side of the head of the screw 86' is provided with an electrically insulative washer 122 so as to insulate the various elements of the accelerometer from the pedestal 54' thereby avoiding the possibility of accidental grounding of any of the elements of the accelerometer.

Thus in the embodiment shown in FIG. 2, as in the embodiment shown in FIG. 1, all of the electrical elements, that is, the crystals and the electrical leads attached thereto are all insulated from the body of the impedance meter, and are therefore not grounded, thereby providing a balanced force and acceleration output for use with conventional differential amplifiers to eliminate ground loop problems and reduce power frequency pickup, all of which makes possible the measurement of acceleration levels of a much lower order than is possible where grounded circuitry is used.

The mounting adapter 26' and the surface 27' are so proportioned relative to the housing 22' and the crystal 38' that the adapter 26', like the adapter 26, is always in pure compression only, thereby substantially eliminating the effect of bending strains upon the accelerometer.

It is pointed out that FIG. 2 is drawn substantially to scale and that, by way of example only, the impedance head housing 22' has an outside diameter of ⅞", a length of ¾", while that portion of the adapter 26' juxtaposed to the housing 22' has a length of ⁷⁄₁₆ inch. Thus it can be seen that the embodiment of the invention shown in FIG. 2 is only slightly greater than half the size of the embodiment shown in FIG. 1. It is also pointed out that the modification shown in FIG. 2 has a frequency response to 10–30,000 cycles per second as compared to a response level of 10–5000 cycles per second for the embodiment shown in FIG. 1.

It is emphasized that the respective embodiments shown each has its own particular applications, the larger embodiment shown in FIG. 1 being particularly adapted for testing structures of extremely large size, while the embodiment shown in FIG. 2 is adapted for testing smaller, less massive structures such as aircraft frames and/or small models of ships or the like.

*Operation*

In the following description of the operation of the instant invention, reference is made only to the embodiment shown in FIG. 1, since the operation of the embodiment shown in FIG. 2 is substantially identical.

In utilizing the instant invention, the mounting adapter 26 is either bolted or otherwise suitably connected to a mechanical element under test, after which a current of suitable magnitude and frequency is applied to the moving coil within the vibration generator casing 13 through the terminals 90. The force of motion of the vibration generator casing 13 which for the reasons set forth above, acts as a vibration mass, is transmitted, via the wire 94, the impedance head cover plate 18, the impedance head housing 22, the barium-titanate force gauge 38, and the adapter 26, to the mechanical element under test. The annular force gauge 38 shows a voltage across its inner 40 and outer 42 peripheral surfaces that is proportionate to the amount of vibratory force applied to its opposite end faces by movement of the impedance head housing 22 relative to the mounting adapter 26, which movement will of course depend upon the nature of the movement of the vibration generator casing 13 and the nature of the element under test. The motion, that is, acceleration, imparted to the element under test is detected by the motion pick-up or accelerometer 52, described in detail above, by virtue of the movement of the inertial mass 78 relative to the pedestal 54, which of course will strain the crystals 62 and 64, thereby causing an output voltage across said crystals. This voltage can be detected across the leads 72 and 76 which in turn are adapted to be connected to suitable voltage measuring devices.

Thus, in utilizing the instant invention, respective voltage readings are obtained which give an indication of the force being applied to the object under test and the acceleration imparted thereto. These quantities are obtained by connecting the force gage 38 and the accelerometer 52 to respective voltage reading devices. Having the respective voltage quantities referred to above, it is possible to determine the mechanical impedance of the mechanical element under test, either by manual calculations or by feeding the data into suitable calculating apparatus, inasmuch as it has been found that mechanical impedance can be defined by the following equation:

$$Z = \left[ \frac{\vec{V}_f / S_f}{\vec{V}_a / S_a} \right] \omega$$

where $\vec{V}_f$=the vector voltage produced by the force gauge 38, $S_f$ is the calibration constant of the force gauge in millivolts per pound, $\vec{V}_a$ is the vector voltage output of the accelerometer 52, and $S_a$ is the calibration constant of the accelerometer in millivolts per inch/second², and $\omega$ equals $2\pi f$ where $f$ is the frequency of vibration.

Thus by connecting the electrical leads from the force gauge and the accelerometer respectively to suitable voltage measuring devices it is possible to obtain the mechanical impedance of an element under test, by utilizing the instant invention and the above equation. It is however emphasized that the voltage obtained from the force gauge 38 and the accelerometer 52 respectively, are vector quantities and that there is a phase angle therebetween, which phase angle may be determined by connecting the aforementioned leads to any one of a number of conventional phase angle meters. A suitable meter of the latter type is manufactured commercially by the Ad-Yu Electronics Lab. Inc., Passaic, N.J., and is known as the angle precision phase meter, type 405–L. Thus by knowing the voltage outputs referred to above it is possible to obtain the mechanical impedance of a device under test and by knowing the phase angle between said voltage outputs it is possible to determine whether the object under test is a pure mass, a pure stiffness, pure resistance or a combination thereof. The phase angle to be more specific, gives the relative magnitude of the resistance and reactance components of the device under test. For example, for a pure mass there would be 0 phase shift between $\vec{V}_f$ and $\vec{V}_a$; for pure stiffness there would be 180° phase shift while for pure resistance, there would be a 90° phase shift.

It is accordingly emphasized that the instant invention provides a relatively simple and foolproof structure for determining the mechanical impedance of a mechanical element, and more specifically the point mechanical impedance thereof. The accelerometer 52 is rendered substantially free of spurious readings induced therein due to compression of the material between the mounting adapter 26 and the point at which the accelerometer is mounted, by virtue of the presence of the annular groove 58 cut in the accelerometer supporting pedestal 54 which serves to isolate the accelerometer from lateral strains in the lower portion of said pedestal and the mounting adapter 26. The upper portion of the accelerometer supporting pedestal is prevented from going into vibration about its supporting point due to the presence of the three bolts 60 triangularly arranged in the manner described above. Further it is pointed out that the means 78 acts not only as an inertial mass, but also acts as an electrostatic shield around the accelerometer elements such as the barium-titanate crystals 62, 64 and the equipment associated therewith. It is also pointed out that the accelerometer structure 52 and the force gauge 38 are separated from one another a substantial distance and that therefore cross-talk, which is a common problem in a device of this type, is almost entirely eliminated.

Various modifications are contemplated and may obviously be resorted to by those skilled in the art without departing from the spirit and scope of the invention, as hereinafter defined by the appended claims.

What is claimed is:

1. A device for determining the mechanical impedance of a mechanical element, said device comprising an impedance head formed of a hollow housing member and a mounting adapter for connecting said impedance head to said mechanical element, said housing member and said mounting adapter having spaced juxtaposed portions which are movable relative to one another, force sensing means interposed in the space between said juxtaposed portions and in contact with both of said portions for sensing movement of one of said portions relative to the other, an accelerometer comprising acceleration sensing means connected to said mounting adapter, said accelerometer being enclosed within said hollow housing but completely free of any contact therewith, a mechanical vibration generator, non-resonant mounting means mounting said generator on said impedance head, said impedance head thereby constituting the sole means of support for said mechanical vibration generator, said non-resonant mounting means including a support means affixed to said impedance head and in spaced juxtaposition to said vibration generator, and flexible means located within said space and interconnected between said generator and said support means, said mechanical vibration generator having a vibratory means operable to impart a vibratory force and vibratory motion to said mechanical element, said vibratory force being transmitted to said mounting adapter to permit sensing of said vibratory force by said forcing sensing means and sensing of said vibratory motion of said mechanical element by said acceleration sensing means to thereby determine the mechanical impedance of said mechanical element.

2. A device for determining mechanical impedance, as set forth in claim 1, wherein said mounting adapter has a base portion which contacts the mechanical element, said base portion being in spaced parallel relationship to said force measuring means and having a lateral extent at least equal to the lateral extent of said force measuring means, whereby forces travelling between said mechanical element and said force measuring means travel through said mounting adapter in a path perpendicular to the spaced parallel surfaces of said mechanical element and said force measuring means.

3. A device for determining mechanical impedance, as set forth in claim 1, wherein said accelerometer includes a plurality of piezoelectric discs having central apertures therein, said piezoelectric discs being located upon the upper surface of said mounting adapter, an inertial mass having a central aperture therein and being supported solely by said piezoelectric discs and thereby being capable of unrestrained lateral movement, and mounting means passing through said inertial mass central aperture and said piezoelectric disc central apertures and fastening into the upper portion of said mounting adapter, thereby defining an accelerometer wherein the unrestrained lateral movement of said inertial mass is transmitted solely and directly to said piezoelectric discs.

4. A device for determining mechanical impedance as set forth in claim 1, wherein said mounting adapter includes a central pedestal section extending inside of and spaced from said housing member, said accelerometer includes an electrosensitive member mounted on said pedestal member, said electrosensitive member having an electrical characteristic which varies in accordance with the deformation thereof; an inertial mass superimposed on said electrosensitive member, connecting means joining said inertial mass to said pedestal member and maintaining said inertial mass in intimate contact solely with said electrosensitive member and movable relative to said pedestal, whereby said electrosensitive member is alternately dynamically stressed in tension or compression between said inertial mass and said pedestal member.

5. A device for determining the mechanical impedance of a mechanical element comprising, a mechanical vibration generator, said vibration generator comprising a vibratory member vibrated thereby, and a casing, an impedance head, means fixedly clamping said member to said impedance head, flexible connection means connecting the vibration generator casing to said impedance head, said flexible connecting means including a plurality of post members connected to said impedance head and located circumferentially of said generator casing and at least one flexible annular member surrounding said casing and being connected between said casing and said post members, said impedance head including a housing member, a mounting adapter base connected to said housing member and adapted for connection to said mechanical element, a pedestal extending inwardly of said impedance head housing member and fixedly connected to said adapter base, an annular body interposed between said impedance head housing member and said mounting adapter base in abutting relation with both, said annular body being composed of an electrosensitive material having an electrical characteristic which varies in accordance with the deformation thereof; an inertial mass connected to said pedestal in spaced relation therewith and movable relative thereto, a disc of electrosensitive material sandwiched between said inertial mass and said pedestal, said disc having an electrical characteristic which varies in accordance with the deformation thereof, electrically conductive members connected to the inner and outer peripheral surfaces of said annular member and to the opposite faces of said disc members respectively for detecting changes in the electrical characteristics of said annular member and said disc member respectively, whereby the force and acceleration imparted to said mechanical element by said generator may be sensed in terms of change in electrical characteristic of said annular member and said disc member respectively, thereby providing data from which the mechanical impedance of said element may be determined.

6. A device for determining mechanical impedance as set forth in claim 5, wherein said impedance head is provided with an outer annular groove at the interconnection between said pedestal and said adapter base.

7. In an apparatus for determining the vibration characteristics of an object, the combination comprising a housing, a mounting adapter connected to one end of said housing and having means at its center adapted to be connected to said object, vibrator means resonantly coupled to the other end of said housing, an annular piezo-electric force sensitive means interposed between said housing and said adapter, an accelerometer mounted on said adapter coaxially inside of and spaced from said housing, said mounting adapter having an end face adapted to contact the surface of said object, the entire periphery of the portion of said end face that is in contact with the surface of said object being at least coextensive with a projection of the outer peripheral edge of said annular force sensitive means onto the surface of said object, whereby vibratory forces transmitted to said object through said housing, said annular member and said adapter, place said adapter in compression or tension in a direction normal to the bottom surface of said adapter, thereby substantially preventing bending stresses in said adapter.

8. In an apparatus for determining the vibration characteristics of an object as set forth in claim 7 wherein the vibrator means coupled to the other end of said housing comprises a casing member, and a vibratory member fixedly connected to said housing, support means fixedly connected to said housing and flexibly connected through non-resonant mounting means to the vibrator casing as the sole support for said vibrator.

9. In an apparatus for determining the vibration characteristics of an object, the combination comprising a housing, a mounting adapter connected to one end of said housing and adapted to be connected to said object, a vibrator means non-resonantly coupled to the other end of said housing by flexible means flexibly interconnected between said vibrator means and the other end of said housing, a force sensitive means interposed between said housing and said adapter, said force sensitive means comprising an annular piezo-electric member for providing an electrical signal as an indication of the force transmitted to said object, electrically conductive means connected to said annular member for conducting said electrical signal to voltage detecting and measuring means, said voltage conducting means being electrically insulated from ground; a vibration sensitive means mounted on said adapter and located coaxially of said housing, said vibration sensitive means comprising, at least one piezo-electric disc and an inertia mass mounted on said disc and movable relative thereto, said inertia mass being completely laterally unrestrained, whereby movement of said inertia mass relative to said disc produces from said disc an electrical signal as an indication of the acceleration of said object in response to the vibratory force; circuit means connected to opposite faces of said disc member for conducting said electrical signal to voltage detecting and measuring means, said circuit means being electrically insulated from ground, the ratio of the electrical signals from said force sensitive means and said acceleration sensitive means being an indication of the mechanical impedance of said object.

10. In an apparatus for determining the vibration characteristics of an object as set forth in claim 9 wherein, said mounting adapter is provided with a flat end face adapted to contact the surface of said object, the portion of said end face in contact with the surface of said object being coextensive with a projection of the outer periphery of said annular force measuring member onto the surface of said object, whereby any forces transmitted to said object through said housing and said adapter stress said adapter in compression and tension in a direction normal to the bottom surface of said adapter substantially preventing bending of said adapter.

References Cited in the file of this patent

UNITED STATES PATENTS

| | | |
|---|---|---|
| 2,808,522 | Dranetz | Oct. 1, 1957 |
| 2,824,243 | Sargeant | Feb. 18, 1958 |
| 2,873,604 | Samsel | Feb. 17, 1959 |

FOREIGN PATENTS

| | | |
|---|---|---|
| 316,407 | Great Britain | Aug. 1, 1929 |